(12) United States Patent
Lin

(10) Patent No.: US 8,582,025 B2
(45) Date of Patent: Nov. 12, 2013

(54) INTERNET-PROTOCOL CAMERA DEVICE WITH HEAT DISSIPATION PLATES

(75) Inventor: Tai-Wei Lin, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 163 days.

(21) Appl. No.: 12/982,909

(22) Filed: Dec. 31, 2010

(65) Prior Publication Data

US 2012/0140113 A1 Jun. 7, 2012

(30) Foreign Application Priority Data

Dec. 7, 2010 (TW) ................................ 99142707 A

(51) Int. Cl.
*H04N 5/225* (2006.01)

(52) U.S. Cl.
USPC .......................................................... 348/374

(58) Field of Classification Search
USPC ............. 348/377, 372–374, 207.99, 375, 376
See application file for complete search history.

(56) References Cited

U.S. PATENT DOCUMENTS

| | | | |
|---|---|---|---|
| 7,298,969 B2 * | 11/2007 | Elberbaum | 396/28 |
| 7,839,451 B2 * | 11/2010 | Bleau et al. | 348/373 |
| 8,233,040 B2 * | 7/2012 | Patel et al. | 348/86 |
| 2006/0115265 A1 * | 6/2006 | Elberbaum | 396/427 |
| 2006/0272857 A1 * | 12/2006 | Arnold | 174/377 |
| 2007/0139887 A1 * | 6/2007 | Lee et al. | 361/700 |
| 2008/0062624 A1 * | 3/2008 | Regen et al. | 361/680 |
| 2008/0164316 A1 * | 7/2008 | Patel et al. | 235/462.43 |

* cited by examiner

*Primary Examiner* — James Hannett
*Assistant Examiner* — Ahmed A Berhan
(74) *Attorney, Agent, or Firm* — Altis & Wispro Law Group, Inc.

(57) ABSTRACT

An internet-protocol camera device includes a lens module and an image pickup module. The lens module guides light to the image pickup module. The image pickup module includes a metal housing, heat generating electronic devices received in the metal housing, heat sinks received in the metal housing, and heat dissipation plates. The metal housing includes a first inner side surface, a second inner side surface, a third inner side surface and a fourth inner side surface connected end-to-end in that order. The first inner side surface faces the third inner side surface. The second inner side surface faces the fourth inner side surface. The heat sinks are mounted on the corresponding heat generating electronic devices. The heat dissipation plates are mounted on the first inner side surface, the second inner side surface, the third inner side surface and the fourth inner side surface.

7 Claims, 3 Drawing Sheets

INTERNET-PROTOCOL CAMERA DEVICE WITH HEAT DISSIPATION PLATES

BACKGROUND

1. Technical Field

The present disclosure relates to an internet-protocol camera device with heat dissipation plates.

2. Description of Related Art

Electronic devices, such as internet-protocol camera devices, typically include a number of heat generating electronic devices, such as high-power integrated chips. Metal heat sinks are attached to the chips to dissipate heat generated therefrom. As the power of the chips becomes higher, more heat is generated from the chips. However, it is difficult to use bigger heat sinks to dissipate heat since room in the internet-protocol camera device is limited, and rather than their being one area free of components there are many small empty spaces throughout an interior of the internet-protocol camera device none of which is suitable for receiving a large heat sink.

Therefore, an internet-protocol camera device with heat dissipation plates, which can overcome the above-mentioned problems, is needed.

DETAILED DESCRIPTION

Figure 1:
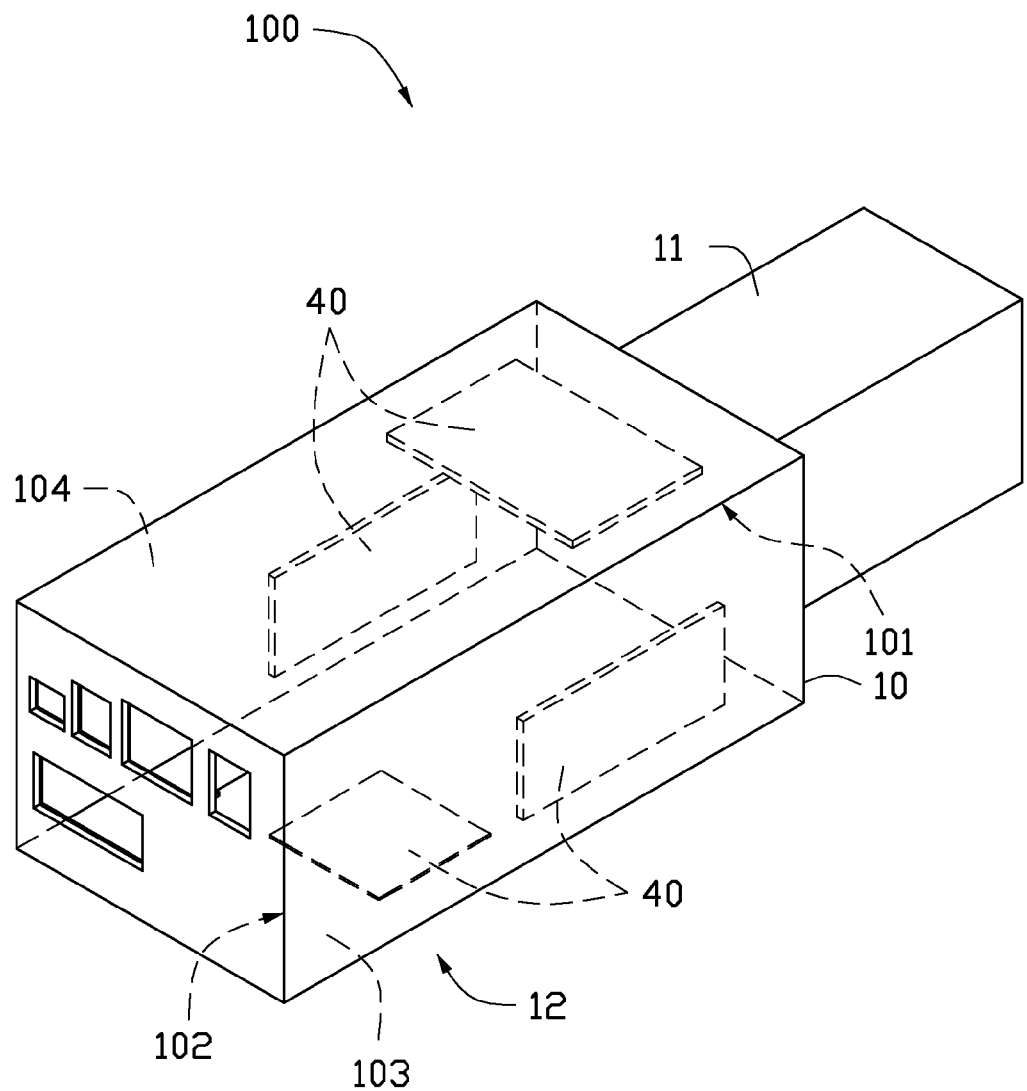
FIG. 1 is a schematic view of an internet-protocol camera device including a housing, according to a first embodiment.
Figure 2:
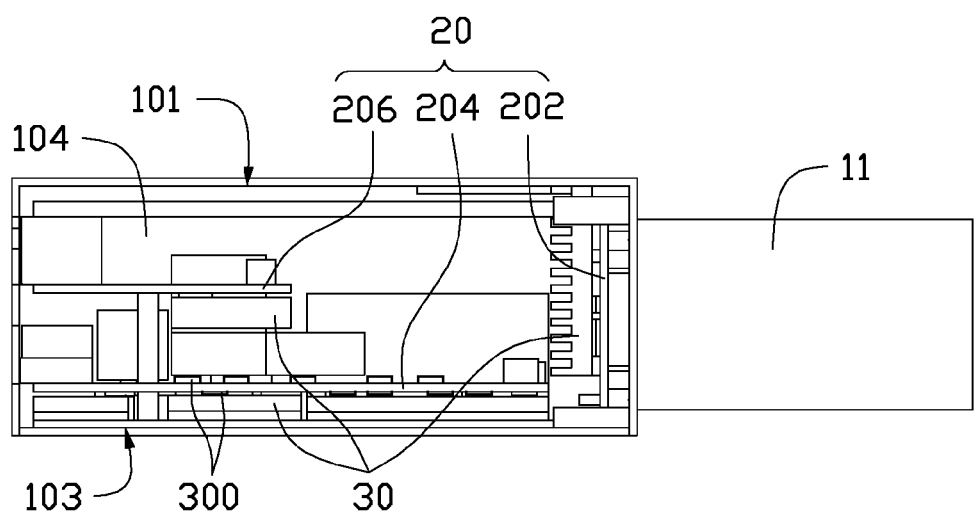
FIG. 2 is a planar view of the internet-protocol camera device of FIG. 1, removing a sidewall of the housing.

Referring to FIGS. 1 and 2, an internet-protocol camera device 100, according to a first embodiment, is shown. The internet-protocol camera device 100 includes a lens module 11 and an image pickup module 12 connected to the lens module 11. The lens module 11 is configured for guiding light to the image pickup module 12 and includes a lens unit and related optical films.

The image pickup module 12 includes a metal housing 10, a number of heat generating electronic devices 20, a number of heat sinks 30, and four heat dissipation plates 40.

The metal housing 10 is substantially cuboid and includes a first inner side surface 101, a second inner side surface 102, a third inner side surface 103, and a fourth inner side surface 104, which are connected end-to-end in that order. The first inner side surface 101 faces the third inner side surface 103. The second inner side surface 102 faces the fourth inner side surface 104. Material of the housing 10 is magnesium aluminum alloy.

In this embodiment, the heat generating electronic devices 20 include a sensor board 202, a main board 204 and an I/O board 206. An image sensor (not shown) is mounted on the sensor board 202 to receive light from the lens module 11 and convert the light into electric signals. The main board 204 processes the electric signals to form related images. The I/O board 206 transmits the related images to display terminals connected to the I/O board 206.

The heat sinks 30 are mounted on the sensor board 202, the main board 204, and the I/O board 206. Material of the heat sinks 30 may be copper or aluminum.

The four heat dissipation plates 40 are mounted on the first inner side surface 101, the second inner side surface 102, the third inner side surface 103, and the fourth inner side surface 104, respectively. Material of the heat dissipation plate 40 may be the same as that of the heat sink 30.

In this embodiment, since the main board 204 does most of the processing for the internet-protocol camera device 100, such as coding and caching data, etc., heat generated from the main board 204 is more than other boards that may be housed in the housing 10. Thus, the heat sink 30 mounted on the main board 204 is in thermal contact with the heat dissipation plate 40 mounted on the third inner side surface 103. Heat generated from the main board 204 can be dissipated rapidly.

Referring to Table 1, taking the main board 204 as an example to test a heat-dissipation effect of the internet-protocol camera device 100, compared with a main board of a typical internet-protocol camera device.

A number of integrated chips 300 (shown as U1, U2, U3, U4, U5, U6, U7, U14, U15 and U17 in the Table 1) are mounted on the main board 204 in the internet-protocol camera device 100. After a predetermined running time of the internet-protocol camera device, temperatures of the chips 300 in the present internet-protocol camera device 100 and temperatures of the chips in the typical internet-protocol camera device are shown in Table 1.

TABLE 1

| Chip | Temperature of the chips in the present internet-protocol camera device (° C.) | Temperature of the chips in the typical internet-protocol camera device (° C.) |
| --- | --- | --- |
| U1 | 66.1 | 88.0 |
| U2 | 71.4 | 93.5 |
| U3 | 70.8 | 92.2 |
| U4 | 60.8 | 77.1 |
| U5 | 58.7 | 74.7 |
| U6 | 60.0 | 74.8 |
| U7 | 58.5 | 74.3 |
| U14 | 67.9 | 85.5 |
| U15 | 65.9 | 83.3 |
| U17 | 66.7 | 89.3 |

From the Table 1, it is clear that temperatures of the chips 300 in the present internet-protocol camera device 100 are lower than those of the chips in the typical internet-protocol camera device. Thus, the present internet-protocol camera device 100 can dissipate heat more efficiently and effectively.

Figure 3:
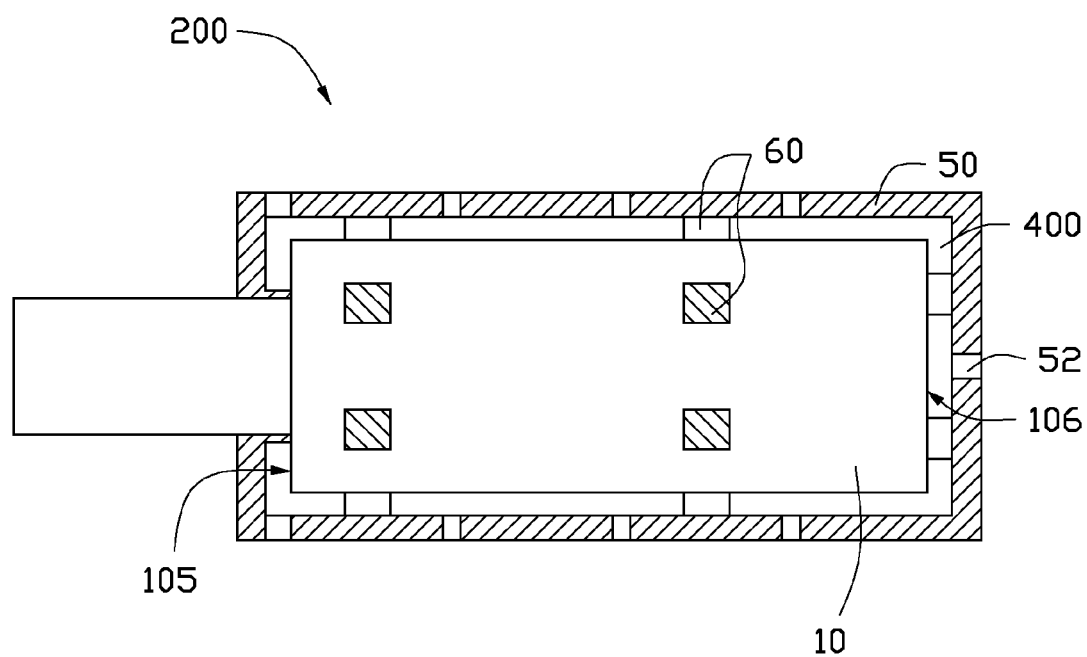
FIG. 3 is a sectional view of an internet-protocol camera device, according to a second embodiment.

Referring to FIG. 3, an internet-protocol camera device 200, according to a second embodiment, is shown. The difference between the internet-protocol camera device 200 of this embodiment and the internet-protocol camera device 100 of the first embodiment is that the internet-protocol camera device 200 further includes a polymer shield 50.

The polymer shield 50 encloses the metal housing 10 of the internet-protocol camera device 200. Specifically, the polymer shield 50 is spatially formed on a first outer side surface, a second outer side surface, a third outer side surface, a fourth outer side surface, a front side surface 105, and a rear side surface 106 of the metal housing 10 by a number of supports 60. The first outer side surface, the second outer side surface, the third outer side surface, and the fourth outer side surface are connected end-to-end in that order. The front side surface 105 and the rear side surface 106 are substantially parallel to each other and connect the first outer side surface, the second outer side surface, the third outer side surface, and the fourth outer side surface together. A passage 400 is formed between the polymer shield 50 and the metal housing 10.

A number of air vents 52 are defined in the polymer shield 50 to ensure effective heat dissipation. The passage 400 is in communication with the air vents 52. Should a user accidentally touch the internet-protocol camera device 200 during operation, they will not get burned, because of the effective and efficient dissipation of heat and protection of the polymer shield 50.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An internet-protocol camera device, comprising:
    a lens module; and
    an image pickup module connected to the lens module, the lens module configured for guiding light to the image pickup module, the image pickup module comprising
        a metal housing comprising a first inner side surface, a second inner side surface, a third inner side surface and a fourth inner side surface connected end-to-end in that order, the first inner side surface facing the third inner side surface, the second inner side surface facing the fourth inner side surface;
        a plurality of heat generating electronic devices received in the metal housing;
        a plurality of heat sinks received in the metal housing mounted on the corresponding heat generating electronic devices; and
        a plurality of heat dissipation plates directly mounted on the first inner side surface, the second inner side surface, the third inner side surface and the fourth inner side surface, wherein one of the heat dissipation plates is in thermal contact with one of the heat sinks.

2. The internet-protocol camera device of claim 1, wherein material of the metal housing is magnesium aluminum alloy.

3. The internet-protocol camera device of claim 1, wherein material of the heat sinks is the same as that of the heat dissipation plates.

4. The internet-protocol camera device of claim 1, further comprising a polymer shield enclosing the metal housing, a plurality of air vents being defined in the polymer shield.

5. The internet-protocol camera device of claim 1, wherein the heat generating electronic devices comprise a sensor board, a main board, an I/O board, and an image sensor, the image sensor being mounted on the sensor board.

6. The internet-protocol camera device of claim 5, wherein the heat sinks are mounted on the sensor board, the main board and the I/O board.

7. The internet-protocol camera device of claim 6, wherein the heat sink mounted on the main board is in thermal contact with the heat dissipation plate mounted on the third inner side surface.

\* \* \* \* \*